J. Fallows,
Spoon.

Nº 49,471. Patented Aug. 15, 1865.

Witnesses.

Inventor.
James Fallows

UNITED STATES PATENT OFFICE.

JAMES FALLOWS, OF PHILADELPHIA, PENNSYLVANIA, ASSIGNOR TO PORTER & BOOTH, OF SAME PLACE.

IMPROVEMENT IN SHEET-METAL SPOONS.

Specification forming part of Letters Patent No. 49,471, dated August 15, 1865.

*To all whom it may concern:*

Be it known that I, JAMES FALLOWS, of the city of Philadelphia, in the State of Pennsylvania, have invented a new and useful Improvement in Sheet-Metal Spoons; and I do hereby declare that the following is a full, clear, and exact description of the construction of the same, reference being had to the accompanying drawings, making a part of this specification, in which—

Figure 1:
Figure 2:
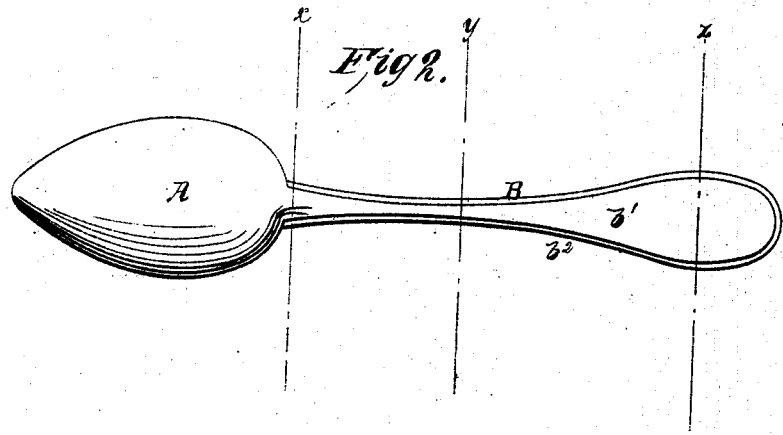

Figure 1 is a longitudinal central section of a sheet-metal spoon of the improved construction; Fig. 2, a representation of the under side of the same, and Figs. 3, 4, and 5 transverse sections of the handle on the respective dotted lines $x\ y\ z$ of Fig. 2.

Like letters of reference indicate the same parts when in the different figures.

Letters Patent of the United States, dated June 3, 1865, were granted to Porter and Booth, as my assignees, for an improvement in sheet-metal spoons or forks, the nature of which improvement consists in making the handles of two pieces of sheet metal lapped together in a peculiar manner and afterward attached to the bowl, and finally passed through a bath of melted metal, so as to cement all the joints securely together and coat the spoon or fork at one operation, for the purpose of producing a more light, cheap, and merchantable article.

The object of the present improvement is substantially the same, and the two halves of the handle are also lapped together and cemented substantially in the same manner also, but with this difference, that whereas in the said patented spoon the handle and bowl consist of three pieces of the sheet metal, while in the present case the handle and bowl consist of but two pieces only, and therefore still further economizes in the manufacture, especially of the smaller-sized spoons.

In the drawings, A is the bowl, and B the handle. The bowl A and the bottom half, $b'$, of the handle B are cut together out of the same piece of sheet metal, and are also simultaneously "formed up" in suitable dies at one operation. The upper half, $b^2$, of the handle B is cut out as much larger than the part $b'$ as will allow the edges of the said part $b^2$ to be lapped down upon the part $b'$ and upon the inner side of the bowl A at $b^3$, respectively, as shown in the drawings, after the said parts $b'$ $b^2$ have been formed up and ornamented in suitable dies. The two parts $b'\ b^2$ are then adjusted together and the laps closed down properly in a suitable die, and, finally, the spoon taken out and passed through a bath of melted tin, so as to cement the joints and coat the whole, thus producing the article in a finished state for the market.

It will be readily seen that by making the one-half of the handle and the bowl of the spoon of a single piece of sheet metal, as described, the smaller-sized spoons can be made with greater facility and economy.

Having thus described my improvement, what I claim as new of my invention, and desire to secure by Letters Patent, is—

A sheet-metal spoon constructed of two pieces of sheet metal, substantially as described and set forth, as an improved article of manufacture.

JAMES FALLOWS.

Witnesses:
BENJ. MORISON,
E. BURGESS WARREN.